(12) United States Patent
Kondo et al.

(10) Patent No.: US 7,394,648 B2
(45) Date of Patent: Jul. 1, 2008

(54) ELECTRIC DOUBLE-LAYER CAPACITOR, ITS MANUFACTURING METHOD, AND ELECTRONIC DEVICE USING SAME

(75) Inventors: Keiichi Kondo, Osaka (JP); Hideki Shimamoto, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 175 days.

(21) Appl. No.: 10/580,472

(22) PCT Filed: Jan. 13, 2005

(86) PCT No.: PCT/JP2005/000630

§ 371 (c)(1),
(2), (4) Date: May 24, 2006

(87) PCT Pub. No.: WO2005/069321

PCT Pub. Date: Jul. 28, 2005

(65) Prior Publication Data

US 2007/0133148 A1 Jun. 14, 2007

(30) Foreign Application Priority Data

Jan. 19, 2004 (JP) ............................. 2004-010093
Jan. 27, 2004 (JP) ............................. 2004-017883

(51) Int. Cl.
*H01G 9/00* (2006.01)
(52) U.S. Cl. ........................ 361/502; 361/503; 29/25.03
(58) Field of Classification Search ................. 361/502, 361/503; 29/25.03
See application file for complete search history.

(56) References Cited

U.S. PATENT DOCUMENTS

2002/0138958 A1 10/2002 Nonaka et al.
2006/0172134 A1* 8/2006 Ro et al. ..................... 428/408

FOREIGN PATENT DOCUMENTS

| JP | 4-088153 | 3/1992 |
|---|---|---|
| JP | 04065814 A * | 3/1992 |
| JP | 6-256008 | 9/1994 |
| JP | 10-509560 | 9/1998 |
| JP | 10-271611 | 10/1998 |
| JP | 11-007962 | 1/1999 |
| JP | 11-288849 | 10/1999 |
| JP | 2000-164466 | 6/2000 |
| JP | 2000-269095 | 9/2000 |
| JP | 2001-297952 | 10/2001 |
| WO | 96/11486 | 4/1996 |
| WO | 2004/087984 | 10/2004 |

* cited by examiner

*Primary Examiner*—Eric Thomas
(74) *Attorney, Agent, or Firm*—Wenderoth, Lind & Ponack, L.L.P.

(57) ABSTRACT

Provided are an electric double-layer capacitor which can have a reduced internal resistance and an improved withstand voltage with a simple structure, and a method for manufacturing the capacitor. The electric double-layer capacitor uses an alloy of carbon and aluminum as a material of the electrode. The electrode is formed by applying carbon to an aluminum foil and heating the aluminum foil with carbon thereon to a temperature at which the aluminum foil and the carbon are alloyed.

26 Claims, 15 Drawing Sheets

FIG. 20 – PRIOR ART

ELECTRIC DOUBLE-LAYER CAPACITOR, ITS MANUFACTURING METHOD, AND ELECTRONIC DEVICE USING SAME

This application is a U.S. National Phase application of PCT International Application PCT/JP2005/000630

TECHNICAL FIELD

The present invention relates to an electric double-layer capacitor (hereinafter, EDLC) used in a variety of electronic devices, a method for manufacturing the EDLC and an electronic device having the EDLC.

BACKGROUND ART

Japanese Patent Unexamined Publications No. H11-288849 (Document 1) and No. 2001-297952 (Document 2) disclose methods for producing an electrode metal material which can reduce the internal resistance of a capacitor. The electrode metal material is used in contact with an electrolytic solution in a capacitor such as an EDLC. These methods reduce the internal resistance of an electrode by fixing carbon particles on a valve metal such as aluminum so as to secure the electric connection between the aluminum and the active carbon on the electrode. Japanese Patent Unexamined Publication No. 2000-269095 (Document 3) discloses a method for reducing the internal resistance of an EDLC by covering the uneven surface of a collector with carbon black particles so as to form a conductive layer. In the three methods, the collectors and the electrodes are all made of pure aluminum and pure carbon.

In Documents 1 and 2 mentioned above, the aluminum portion is covered with an oxide film caused by the water in the electrolytic solution. The potential to form the oxide film can be detected by the reaction potential on the oxidizing side, which can be measured by CV (cyclic voltammetry) or the like. An example of the CV measurement is shown in FIG. 20. In FIG. 20, the horizontal and vertical axes represent potential and current, respectively. The reference electrode is an Ag/Ag+ electrode and the counter electrode is Pt. As the working electrodes, an aluminum electrode and an aluminum electrode with carbon particles fixed thereon are used for comparison. The results show that the aluminum electrode, and the aluminum electrode with the carbon particles fixed thereon have nearly the same reaction potential. This means that both electrodes have an oxide film covering the aluminum.

These EDLCs, which have a capacitance large enough to supply a large current, can be used in electronic devices such as electric vehicles (EV) as disclosed in Japanese Patent Unexamined Publication No. H10-271611 (Document 4).

However, the aforementioned conventional EDLCs require a complicated and difficult-to-control process to from electrodes as follows. Carbon particles are fixed on aluminum and the aluminum is etched so that the carbon particles are halfway fixed on and slightly exposed from the aluminum.

The electric connection entirely depends on carbon particles, so that the reliability in fixing the carbon particles is very important for securing conduction. On the other hand, the aluminum portion covered with the oxide film caused by the water in the electrolytic solution does not contribute to conduction. Since the conductive portion (the carbon particle portion) and the nonconductive portion (the oxide film portion) are formed on the same aluminum foil surface, it is difficult to meet both conductivity and withstand voltage at the same time.

Because of being covered with the oxide film caused by the water in the electrolytic solution, the aluminum portion has a potential window whose size is limited by the reaction at the time of forming the oxide film. This results in a reduction in the withstand voltage.

In Document 4, a large number of EDLCs must be connected in series when used as the power supply unit of the EV because the withstand voltage cannot be increased. For example, if each EDLC has a withstand voltage of 2V and the EV requires a voltage of 400V, then as many as 200 EDLCs are required. This results in an increase in the size of the power supply unit. In other words, it is inevitable to improve the withstand voltage of each EDLC for the size reduction of the power supply unit. On the other hand, it is also being tried to improve the withstand voltage of electrolytic solutions, and electrolytic solutions with comparatively high withstand voltages are being developed.

However, the low withstand voltage of EDLCs results from the deterioration of the aluminum electrode foils. Therefore, deteriorated aluminum electrode foils cause a reduction in the withstand voltage of the EDLCs even with an electrolytic solution having a comparatively high withstand voltage.

SUMMARY OF THE INVENTION

The present invention provides an electric double-layer capacitor including an element which is composed of a pair of polarizable electrodes either wound or laminated with a separator disposed therebetween and which is sealed in a case with an electrolytic solution, wherein the polarizable electrodes are made of a material including an alloy of carbon and aluminum.

The present invention further provides an electric double-layer capacitor including polarizable electrodes that are electrode foils at least one of which is made of aluminum, and the at least one of the electrode foils is coated on the front and rear sides with aluminum fluoride.

The present invention further provides an electric double-layer capacitor including a case which is coated on at least the inner surface thereof with aluminum fluoride.

BRIEF DESCRIPTION OF THE DRAWINGS

FIG. 20 is a characteristic view showing the reaction potential on the oxidizing side of a conventional collecting electrode.

DETAILED DESCRIPTION OF PREFERRED EMBODIMENTS

Embodiments of the present invention will be described in detail as follows with reference to accompanying drawings. Note that the drawings are only schematic and do not show the exact dimensions of each component.

First Exemplary Embodiment

Figure 1:
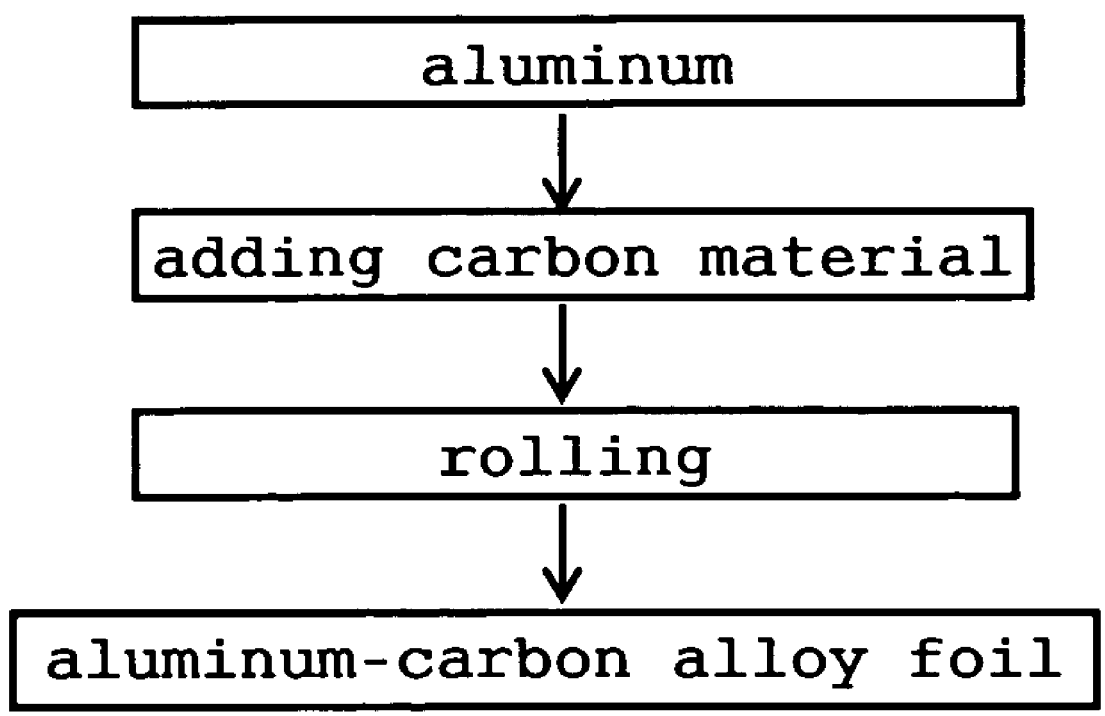
FIG. 1 is a production flowchart showing a method for manufacturing an electrode of an EDLC of a first embodiment of the present invention.

FIG. 1 is a production flowchart showing a method for manufacturing an electrode of an EDLC of a first embodiment of the present invention.

As shown in FIG. 1, first of all, an aluminum foil is prepared. The aluminum foil is coated with a carbon material containing carbon black having an average particle diameter of 0.3 μm. Then, the aluminum foil coated with the carbon material is rolled out at temperatures of not less than 300° C. to form an aluminum-carbon alloy layer with a composition of $Al_4C_3$.

The heating temperature has only to be not less than the alloying temperature. The $Al_4C_3$ alloy layer is found to have a thickness of about 1 μm by SIMS analysis. The $Al_4C_3$ alloy layer is formed with some degree of variation in stoichiometry, and the variation is conspicuous at the interface between aluminum and $Al_4C_3$.

Figure 2A:
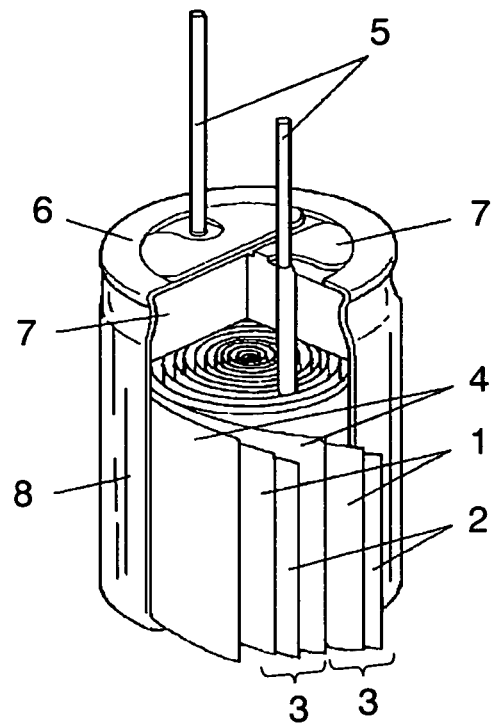
FIG. 2A is a partially broken perspective view showing a structure of the wound EDLC of the first embodiment of the present invention.
Figure 2B:
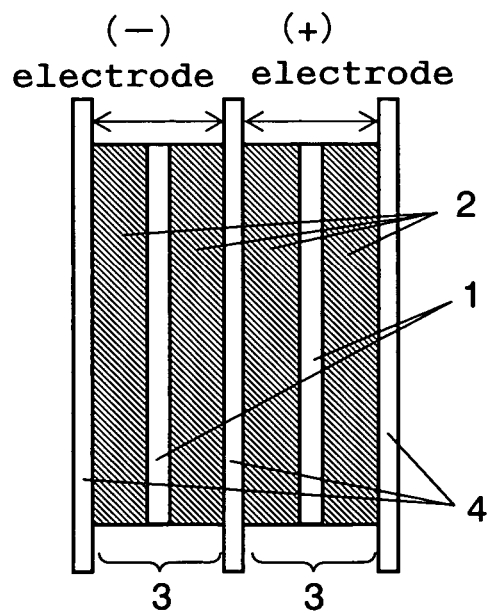
FIG. 2B is a main sectional view showing the structure of the wound EDLC element of the first embodiment of the present invention.

By using the aluminum electrode containing the $Al_4C_3$ alloy layer formed in this manner, a wound EDLC shown in FIGS. 2A and 2B is manufactured. In FIGS. 2A and 2B, each electrode body 3 includes collector 1 of an aluminum electrode containing the aforementioned $Al_4C_3$ alloy layer, and electrode layer 2 mainly made of active carbon and formed on the front and rear surfaces of collector 1. The EDLC further includes separators 4, lead wires 5, ring packing 6, sealant 7 and case 8, which is made of aluminum.

The wound EDLC with the aforementioned structure is manufactured as follows. First of all, as described above with FIG. 1, each collector 1 is formed by applying the 1 μm-thick $Al_4C_3$ alloy layer on the front and rear surfaces of the aluminum foil, which is 30 μm thick. Then, a coating solution for forming electrodes is applied on the front and rear surfaces of collector 1 so as to form electrode layers 2, each of which is 85 μm thick. As a result, electrode bodies 3 each having a total thickness of 200 μm are complete. The coating solution for forming the electrodes is prepared as follows. Active carbon is added with 8.1 wt % of a binder such as PTFE and 10.8 wt % of a conductive additive such as acetylene black, kneaded together with an appropriate amount of water, and then evenly granulated using a pressure homogenizer.

In order to increase the electrode density so as to improve the strength, electrode bodies 3 are press-molded to have a thickness of 195 μm each. Then, a pair of lead wires 5 are respectively connected to the positive and negative electrodes bodies 3. The positive and negative electrodes have separators 4 disposed therebetween and are wound together. Separator 4 is 35 μm thick and made of a cellulose material. As a result, an element, which is 10 mm in winding diameter and 40 mm in width, is complete. The element is inserted in a dehumidified atmosphere into case 8 together with an electrolytic solution. The electrolytic solution has a concentration of 0.69 mol/kg, and contains propylene carbonate (PC) as a solvent and tetraethylammonium tetrafluoroborate (TEABF4) as a solute. Case 8 is 12 mm in diameter and 48 mm in height. Finally, sealant 7 is applied so as to complete the EDLC.

Ten EDLCs of the present embodiment having the aforementioned structure and ten conventional EDLCs for comparison are manufactured and measured for capacity and internal resistance. The mean values of the results are shown in Table 1 below.

The conventional EDLCs are manufactured based on the technique of Documents 1 and 2 mentioned above. The capacity and internal resistance are calculated from the behavior of the voltage between terminals after performing a constant current charge at 1.0 A, a constant voltage charge at 2.0V, a leave for 6 minutes 20 seconds, and a constant current discharge at 1.0 A in this order.

The resistance is calculated from the initial IR drop during the constant current discharge.

TABLE 1

|  | Conventional product | Embodiment 1 |
| --- | --- | --- |
| Capacity (F) | 95.1 | 96.2 |
| Resistance (mO) | 31.2 | 20.1 |

As apparent from Table 1, the EDLC of the present embodiment, which includes the collectors containing the aluminum-carbon alloy layer with a composition of $Al_4C_3$, has only about ⅔ as high an internal resistance as the EDLC including the conventional collectors. The EDLC of the present embodiment and the conventional EDLC have nearly the same capacity at the time. The results indicate that the use of the collectors containing the aluminum-carbon alloy layer with a composition of $Al_4C_3$ can achieve an EDLC with a low resistance almost without reducing the capacity.

Figure 3:
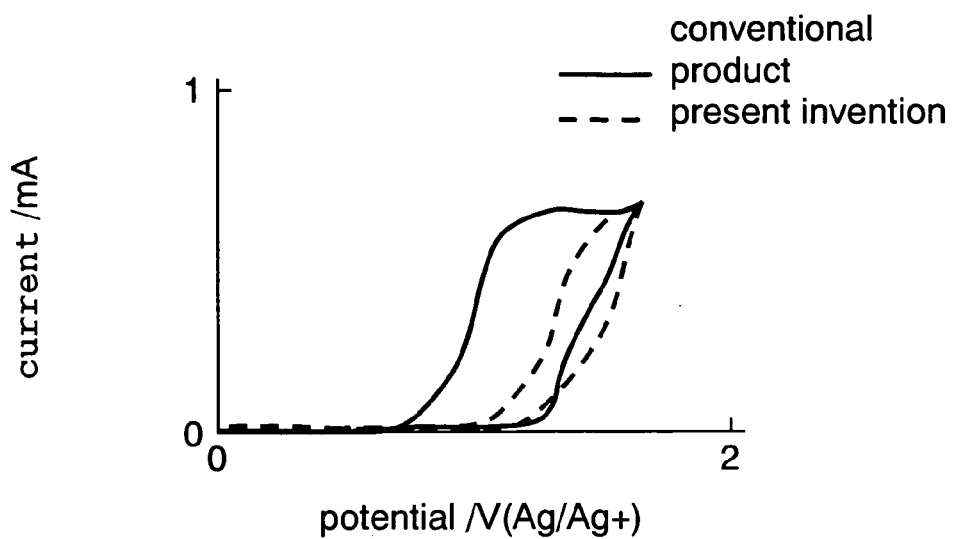
FIG. 3 is a characteristic view showing the reaction potential on the oxidizing side of a collecting electrode of the wound EDLC element of the first embodiment of the present invention.

The EDLCs of the present embodiment and the conventional EDLCs are also subjected to CV measurement to examine the reaction potential of the collecting electrodes containing the $Al_4C_3$ alloy layer of the present embodiment. The results are shown in FIG. 3. The reference electrode is an Ag/Ag+ electrode and the counter electrode is Pt. As the working electrodes, a collecting electrode containing the $Al_4C_3$ alloy layer, an aluminum electrode having carbon particles fixed thereon, and an aluminum electrode are used for comparison. The results show that the collecting electrode containing the $Al_4C_3$ alloy layer has a more noble reaction potential than the aluminum electrode having carbon particles fixed thereon and the other aluminum electrode. In other words, the use of the electrodes containing the $Al_4C_3$ alloy layer as the collectors can make the potential window larger than in the conventional electrodes. This seems to indicate that an EDLC can have a high withstand voltage by using the collecting electrodes containing the $Al_4C_3$ alloy layer.

As described above, the present embodiment achieves an EDLC including the collecting electrodes containing the $Al_4C_3$ alloy layer lower in resistance and higher in withstand voltage than an EDLC having the conventional collecting electrodes. The collecting electrodes containing the $Al_4C_3$ alloy layer in the present embodiment are formed by applying carbon to the aluminum foil and heating it. However, the present invention is not limited to this method: the carbon can be applied to the aluminum foil by a vacuum technique such as vacuum deposition, sputtering or CVD.

It is alternatively possible to vacuum-deposit aluminum onto a carbon electrode and to heat it. The vacuum deposition can be replaced by sputtering or CVD.

Second Exemplary Embodiment

Figure 4:
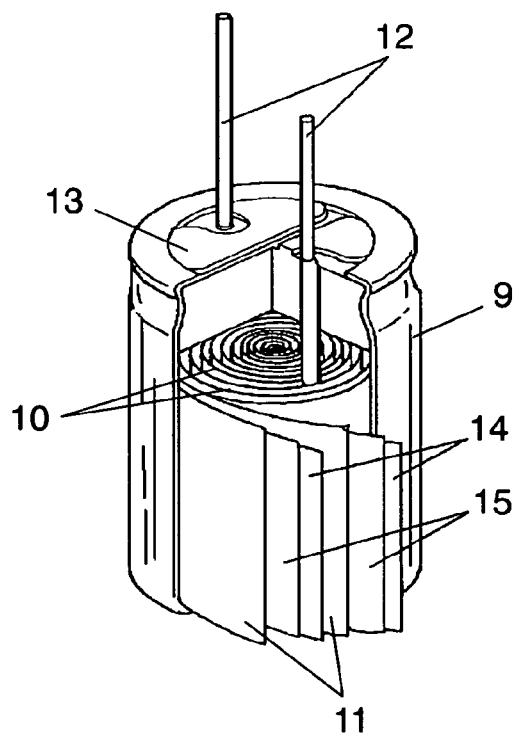
FIG. 4 is a partially broken perspective view showing a structure of an EDLC of a second embodiment of the present invention.
Figure 5:
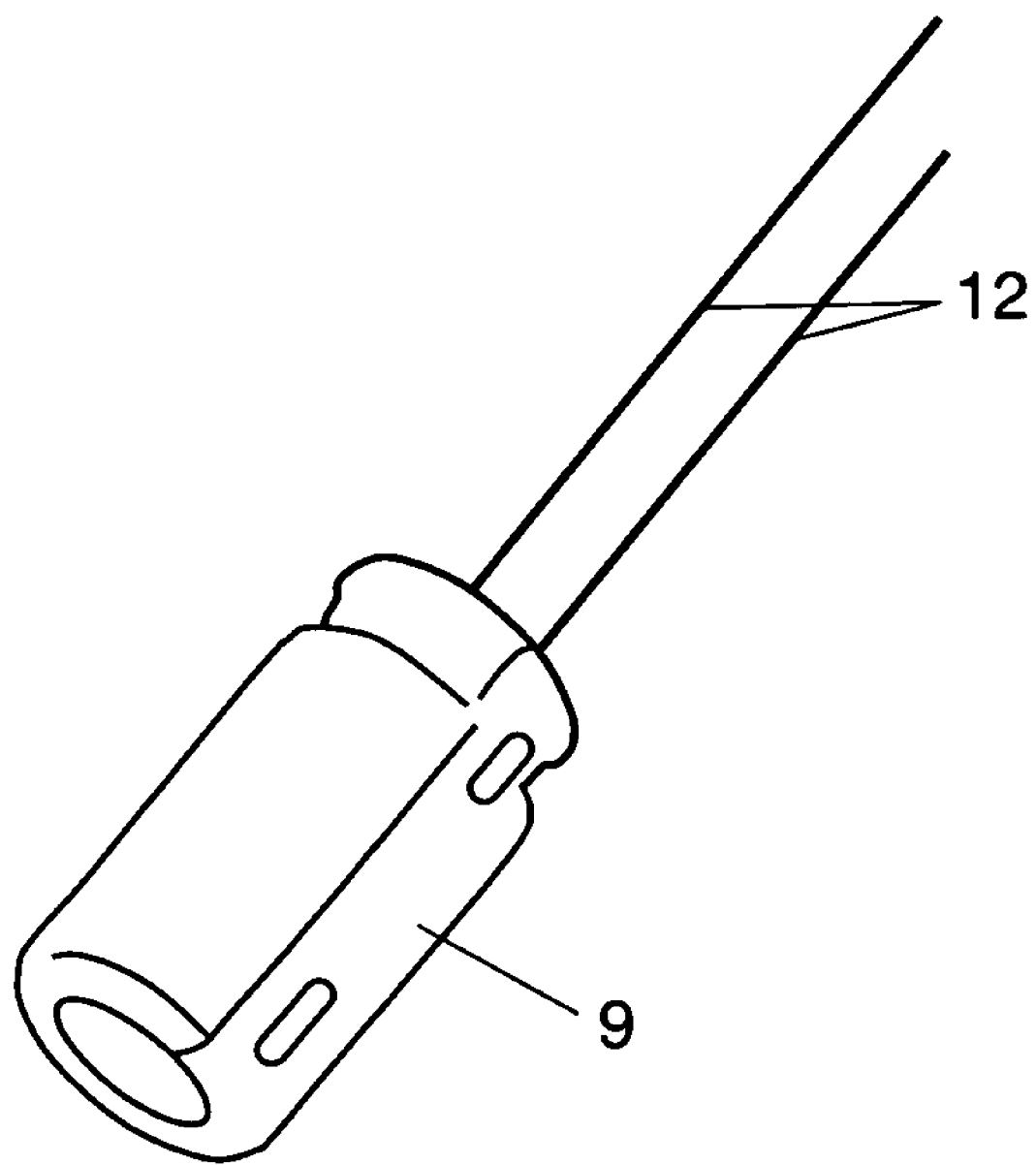
FIG. 5 is a perspective view showing the EDLC of the second embodiment of the present invention.

FIG. 4 is a partially broken perspective view showing a structure of an EDLC of a second embodiment of the present invention. FIG. 5 is a perspective view showing the EDLC.

In FIGS. 4 and 5, the EDLC includes case 9 made of aluminum, an electrolytic solution filled in case 9 and two electrode foils 10 made of aluminum and soaked in the electrolytic solution. Electrode foils 10 are alternately laminated with separators 11 and wound together as shown in FIG. 4. Two electrode foils 10 are connected with each of lead wires 12. Lead wires 12 are drawn out of case 9 through sealing rubber 13. Each aluminum electrode foil 10 is coated on the front and rear surfaces with aluminum fluoride 14 and further with active carbon 15 as shown in FIG. 8.

The principle of operation of the EDLC will be described as follows with reference to FIG. 6.

Figure 6A:
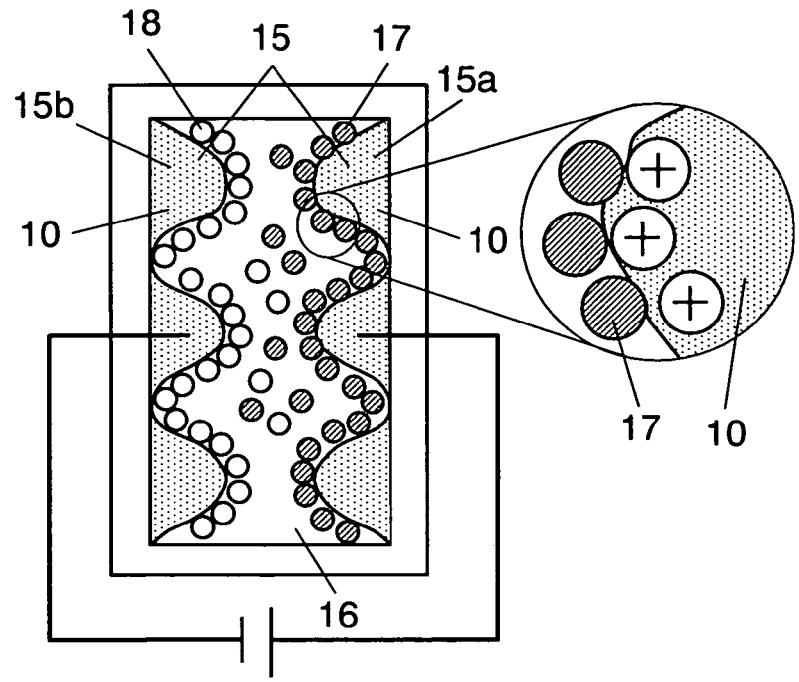
FIG. 6A is a sectional view showing the principle of the EDLC of the second embodiment of the present invention in charging conditions.
Figure 6B:
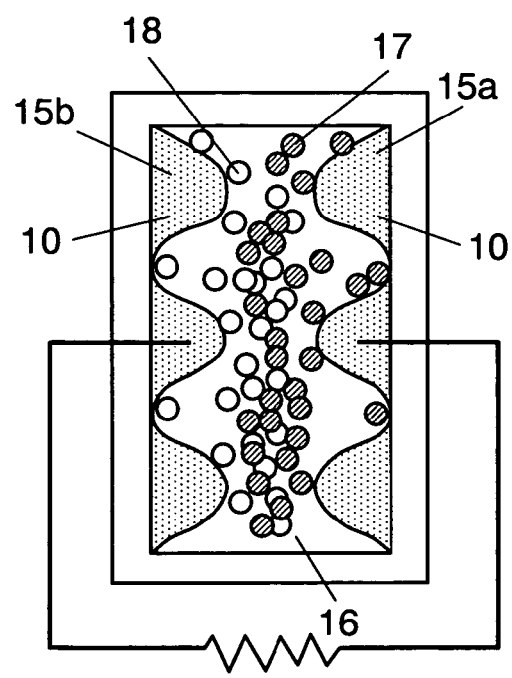
FIG. 6B is a sectional view showing the principle of the EDLC of the second embodiment of the present invention in discharging conditions.

FIGS. 6A and 6B are sectional views of the EDLC in charging conditions and in discharging conditions, respectively. In charging conditions shown in FIG. 6A, electrostatic attraction attracts anions 17 in electrolytic solution 16 toward anode active carbon 15a and cations 18 toward cathode active carbon 15b. Then, ion layers called electric double layers are respectively formed in the vicinity of anode active carbon 15a and cathode active carbon 15b so as to accumulate electric charges there. On the other hand, in discharging conditions shown in FIG. 6B, anions 17 and cations 18 are released from anode active carbon 15a and cathode active carbon 15b, respectively, and dispersed into electrolytic solution 16.

Figure 8A:
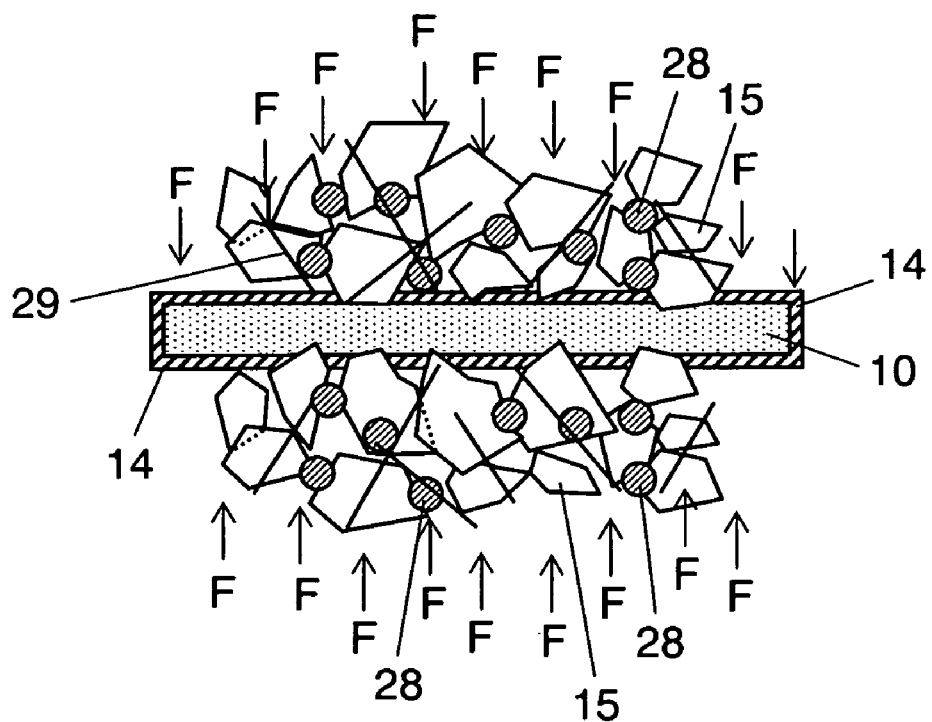
FIGS. 8A to 8C are sectional views showing an electrode foil of the EDLC of the second embodiment of the present invention.
Figure 8B:
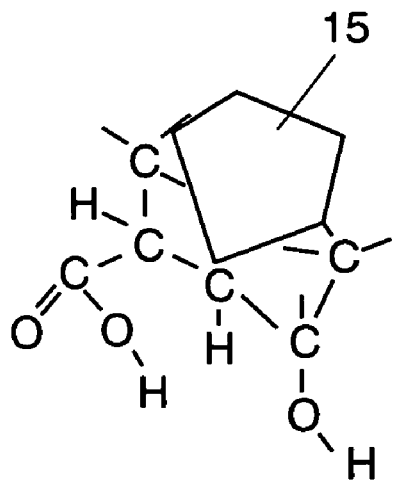
Figure 8C:
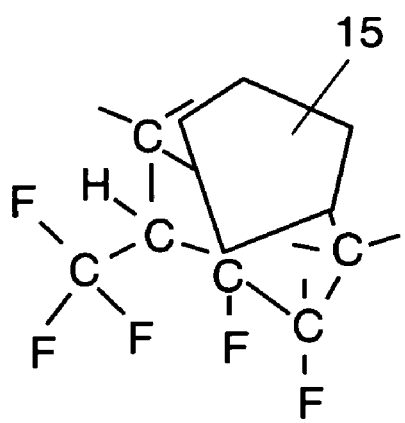

The EDLC of the present embodiment is characterized in that the surface of each electrode foil 10 is coated with aluminum fluoride 14 as shown in FIG. 8.

The electrodes of conventional EDLCs are made of active carbon-coated aluminum, and the aluminum elutes during the voltage application as shown in FIG. 6A, thereby deteriorating the electrodes. The cause of the aluminum elution seems to be the weak bonding between the aluminum atoms and the oxygen atoms in an oxide film, that is, an aluminum oxide film, which usually exists on the surface of aluminum.

On the other hand, the bonding between the aluminum atoms and the fluorine atoms in aluminum fluoride is stronger than the bonding between the aluminum atoms and the oxygen atoms in aluminum oxide. This strong bonding seems to prevent the aluminum from eluting into electrolytic solution 16.

One method for producing aluminum fluoride is plasma treatment. FIG. 7 show sectional views of processes of the plasma treatment.

Figure 7A:
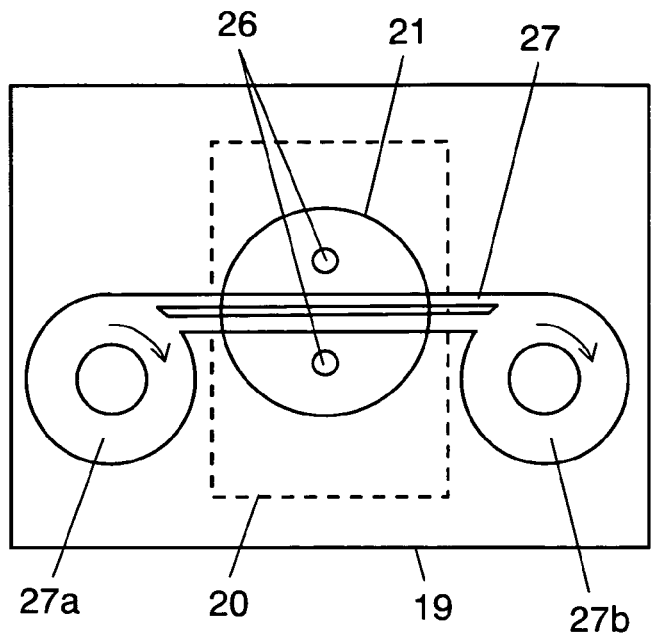
FIGS. 7A and 7B are sectional views showing manufacturing processes of the EDLC of the second embodiment of the present invention.
Figure 7B:
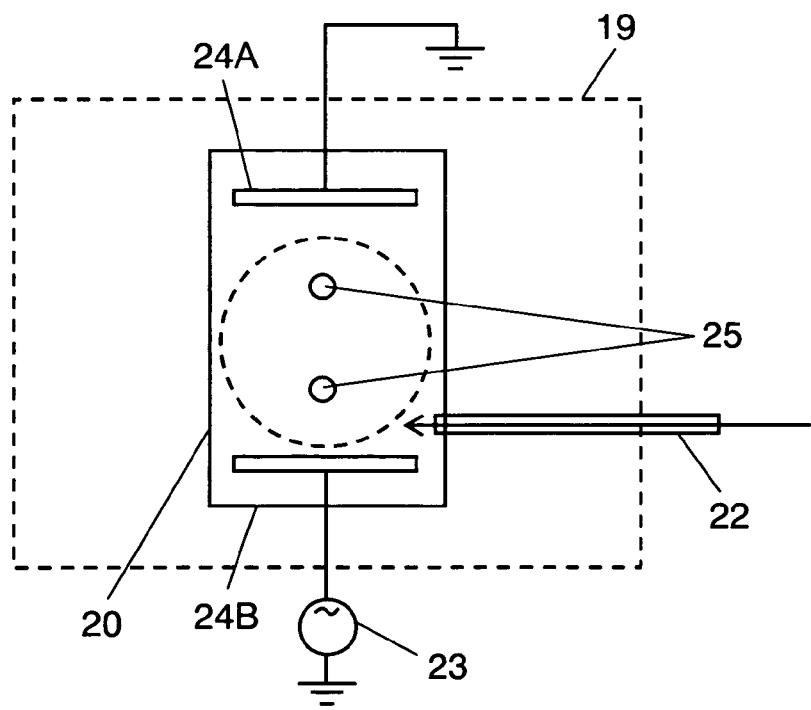

FIG. 7A shows a sectional view of a plasma treatment chamber, and FIG. 7B shows a sectional view of a plasma generation chamber. Plasma treatment chamber 19 and plasma generation chamber 20 are connected with each other via chamber connection hole 21. In FIG. 7B, plasma is generated by injecting a gas mixture consisting of argon and carbon tetrafluoride through gas inlet hole 22 into between electrodes 24A and 24B connected to high frequency power source 23. The plasma is supplied from plasma outlet holes 25 into plasma treatment chamber 19 through plasma inlet holes 26.

In FIG. 7A, plasma is introduced into plasma treatment chamber 19 through plasma inlet holes 26. Plasma treatment chamber 19 includes a roll of electrode foil 27. Electrode foil 27 which is unwound as untreated electrode foil 27a from the electrode foil unwinding side is subjected to plasma treatment, and is rewound as treated electrode foil 27b on the electrode foil rewinding side. Plasma treating both the front and rear surfaces of electrode foil 27 at the same time in this manner can improve the productivity compared with the case of treating each surface separately. Electrode foil 27 shown in FIG. 7 is cut into length and used as electrode foils 10 shown in FIG. 4.

In the present embodiment, the plasma treatment apparatus is composed of plasma treatment chamber 19 and plasma generation chamber 20. It goes without saying that plasma generation and plasma treatment can be performed in the same chamber by providing a pair of plasma-generating electrodes with an electrode foil sandwiched therebetween. This arrangement can achieve efficient plasma treatment.

If the plasma treatment is performed before active carbon 15 shown in FIG. 8 is fixed to electrode foil 27 shown in FIG. 7, aluminum electrode foil 10 and active carbon 15 shown in FIG. 8 have aluminum fluoride 14 therebetween, thereby increasing the resistance value of the electrode. Therefore, it is preferable to perform the plasma treatment after active carbon 15 is fixed to electrode foil 10 as shown in FIG. 8.

FIG. 8 is a sectional view showing electrode foil 10, which is plasma-treated after active carbon 15 is fixed to the front and rear surfaces thereof. In FIG. 8A, the symbol "F" represents fluorine atoms. In order to fix active carbon 15 to electrode foil 10, conductive additive 28 and binder 29 are added to active carbon 15 so as to form a conductive composition. The conductive composition consists of active carbon 15, conductive additive 28 and binder 29 in a weight ratio of 80:10:10. Active carbon 15 has at its terminal hydrophilic groups such as hydroxyl groups and carboxyl groups as shown in FIG. 8B. Therefore, active carbon 15 has a low affinity with the hydrophobic electrolytic solution, which means that the electrolytic solution has a low wettability. However, the low wettability can be improved by the plasma treatment because it substitutes fluorine for the hydrophilic groups. In other words, active carbon 15 improves affinity with hydrophobic electrolytic solution 16, thereby facilitating the permeation of electrolytic solution 16 into fine pores of electrode foil 10. As a result, the real electrode area increases, resulting in the improvement in capacitance.

Figure 9:
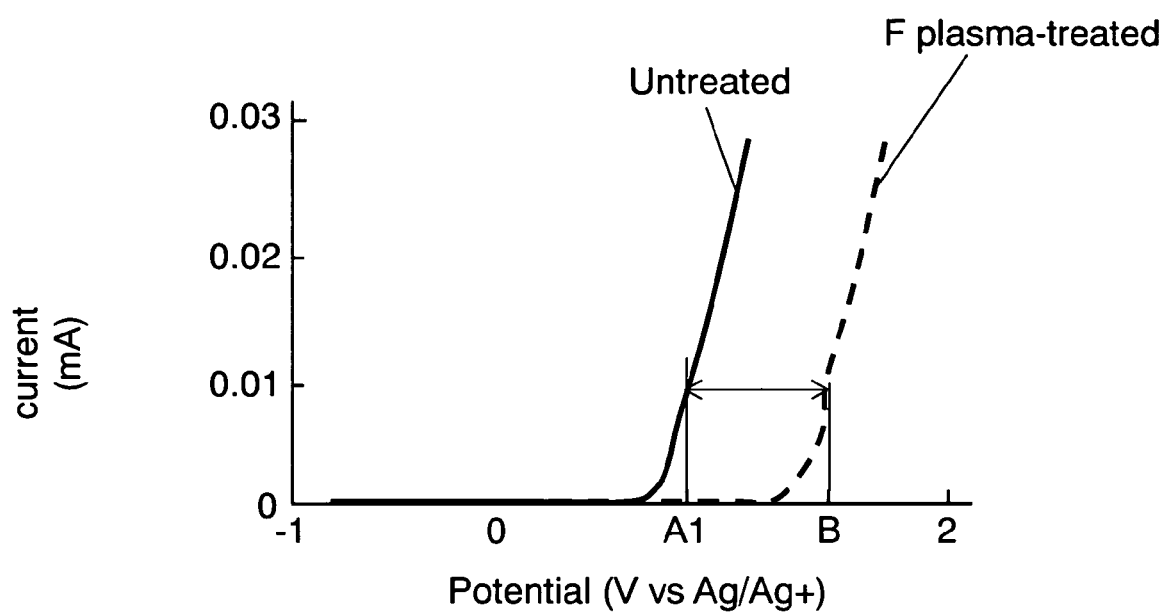
FIG. 9 is a withstand voltage characteristic of the anode of the EDLC of the second embodiment of the present invention.

FIG. 9 is a withstand voltage characteristic of the anode of the EDLC of the present embodiment. Here, the potential at a current value of 0.01 mA is defined as the withstand voltage of the anode. As electrolytic solution 16, TEABF4 is used.

In a conventional EDLC, the electrode foil not subjected to the plasma treatment with fluorine has a withstand voltage of 0.9V ("A" in FIG. 9). In contrast, electrode foil 3 subjected to the plasma treatment has an improved withstand voltage of 1.5V ("B" in FIG. 9).

A withstand voltage comparison shows that the conventional EDLC and the EDLC of the present invention have withstand voltages of 2.0 V and 2.6 V, respectively. This means that the withstand voltage has improved by 30%.

As described above, the use of electrode foil 10 whose surface is coated with aluminum fluoride 14 can improve the withstand voltage of an EDLC.

Third Exemplary Embodiment

Figure 10A:
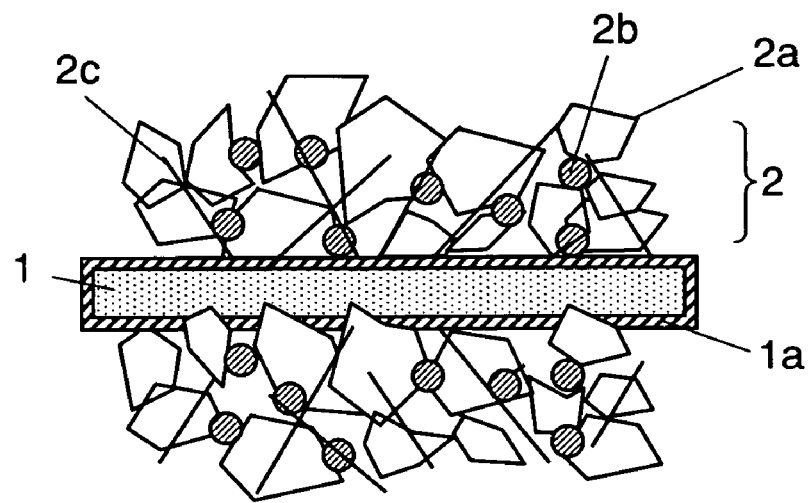
FIG. 10A is a sectional view showing an electrode body in an EDLC of a third embodiment of the present invention before the electrode body is treated with plasma.
Figure 10B:
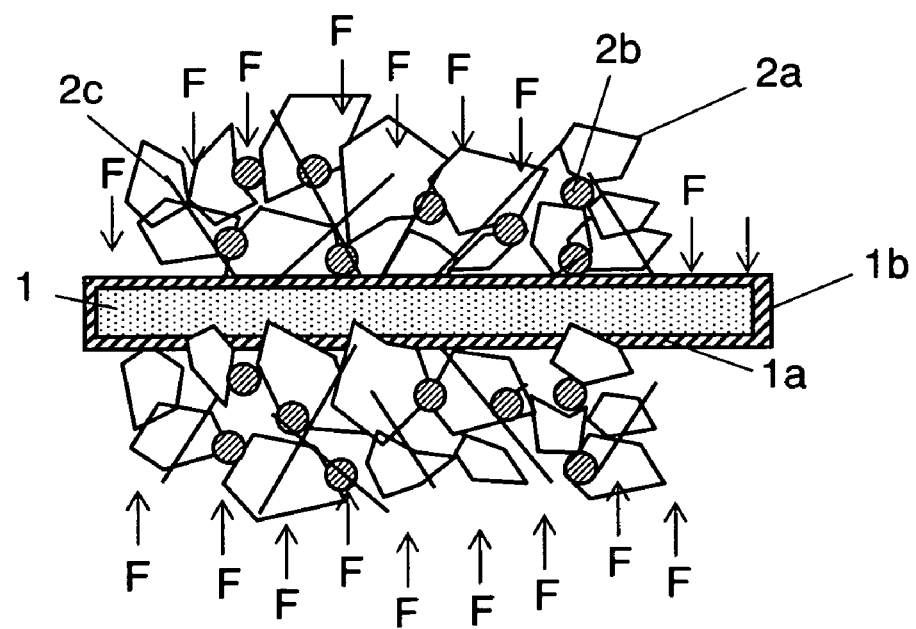
FIG. 10B is a sectional view showing the electrode body in the EDLC of the third embodiment of the present invention after the electrode body is treated with plasma.

FIGS. 10A and 10B are sectional views showing an electrode body in an EDLC of a third embodiment of the present invention before and after the electrode body is plasma-treated, respectively. The electrode body is formed in the same manner as described in the first embodiment as follows. First, 2 μm-thick aluminum-carbon alloy layer 1a with a composition of $Al_4C_3$ is formed on the surface of collector 1 made of a 20 μm-thick aluminum foil, and then electrode layer 2 mainly composed of active carbon 2a is formed on $Al_4C_3$ alloy layer 1a. Note that electrode layer 2 mainly composed of active carbon 2a further contains conductive additive 2b and binder 2c.

The electrode body thus formed is subjected to a plasma treatment in accordance with the requirements shown in Table 2 below. In the electrode body subjected to the plasma treatment, as shown in FIG. 10B, the portion of $Al_4C_3$ alloy layer 1a that is in contact with collector 1 made of aluminum foil and active carbon 2a has no change before and after the plasma treatment. The unit "sccm" in flow rate represents a gas flow rate (cc/min.) in normal operating conditions.

TABLE 2

| Pressure | 10 Pa |
| --- | --- |
| RF power | 1000 W |
| Ar gas flow rate | 20 sccm |
| $CF_4$ gas flow rate | 80 sccm |
| RF frequency | 20 kHz |

On the other hand, the portion of $Al_4C_3$ alloy layer 1a that is exposed without being sandwiched between collector 1 and active carbon 2a is fluorinated by the plasma treatment, and changed into $AlF_3$ alloy layer 1b. Thus, the plasma treatment can be applied to previously change the aluminum component into a composition of $AlF_3$. As a result, the aluminum elution can be avoided when the electrode body is soaked in the electrolytic solution and charge-discharge is performed. This is how a reduction in capacity and resistance of the EDLC is prevented. More specifically, the electrode body which is untreated with plasma (the electrode body including aluminum-carbon alloy layer 1a with a composition of $Al_4C_3$, and electrode layer 2 mainly made of active carbon 2a formed on $Al_4C_3$ alloy layer 1a) can reduce the contact resistance between electrode layer 2 and collector 1 by being disposed therebetween. However, when charge-discharge is performed with the electrode body soaked in the electrolytic solution, aluminum elutes from $Al_4C_3$ alloy layer 1a and reacts with the fluorine component contained in the electrolytic solution as to form an AlF compound. The AlF compound is attached to the surface of active carbon 2a. This reduces the active carbon area, and thus the capacity of the EDLC.

The AlF compound, which is not a good conductor, also causes an increase in the resistance as the reaction advances. However, plasma-treating the electrode body as in the present embodiment can reduce the aluminum elution so as to prevent the deterioration in capacity and resistance. Table 3 below shows the properties of an EDLC including the electrode body of the present embodiment in comparison with the properties of the conventional product. The term "DCR" stands for direct current resistance.

TABLE 3

|  |  | Embodiment 3 | Conventional product |
| --- | --- | --- | --- |
| Initial | capacity | 78 F | 75 F |
|  | DCR | 15 mΩ | 20 mΩ |
| in 1000 H at 60° C. and 2.5 V | capacity | 70 F | 59 F |
|  | DCR | 32 mΩ | 49 mΩ |

As apparent from Table 3, the EDLC of the present embodiment is excellent in both capacity and resistance in the initial stages, and shows little deterioration after the test.

In the requirements of the plasma treatment shown in Table 2, the Ar gas can be replaced by other rare gases to obtain the same results.

The $CF_4$ gas can be replaced by a fluorocarbon gas such as $C_2F_6$, $C_3F_8$, $C_4F_8$, $C5F_8$, $C_3F_6$ or $CH_3F$ to obtain the same results.

The RF frequency is 20 kHz in Table 2, but it has only to be in the range of not less than 20 kH and not more than 20 MH. For example, it can be 40 kHz or 13.56 MHz.

Fourth Exemplary Embodiment

Figure 11A:
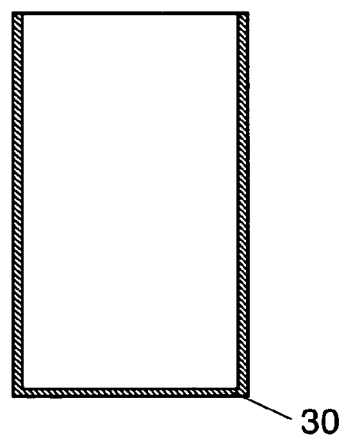
FIG. 11A is a sectional view showing a case in an unprocessed state, which is used in an EDLC of a fourth embodiment of the present invention.
Figure 11B:
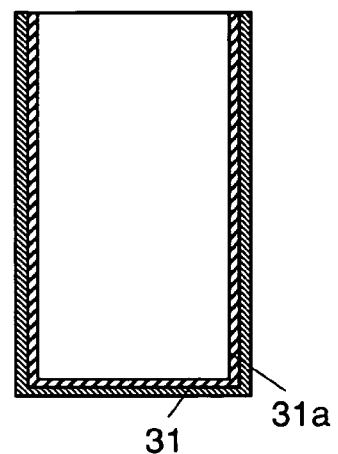
FIG. 11B is a sectional view showing a case in a processed state, which is used in the EDLC of the fourth embodiment of the present invention.

FIGS. 11A and 11B are sectional views showing a case in an unprocessed state and a case in a processed state, respectively, which are used in an EDLC of a fourth embodiment of the present invention.

Figure 12A:
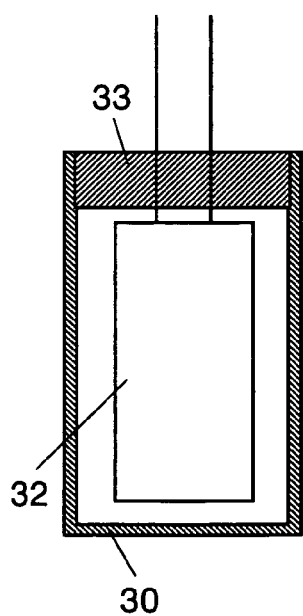
FIG. 12A is a sectional view showing a conventional product for comparison with the EDLC of the fourth embodiment of the present invention.
Figure 12B:
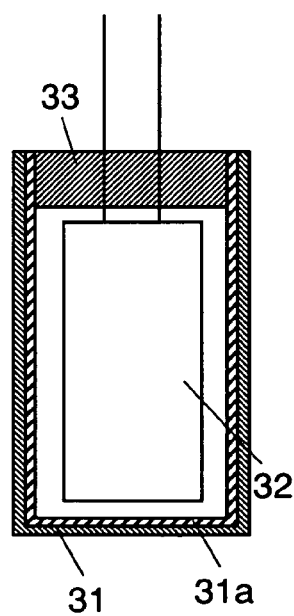
FIGS. 12B and 12C are sectional views showing the EDLC of the fourth embodiment of the present invention.
Figure 12C:
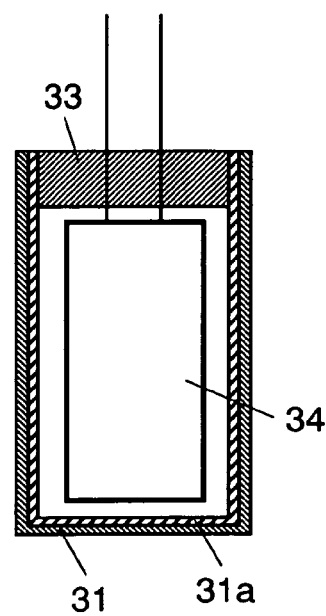

FIGS. 12A to 12C are sectional views showing structures of EDLCs using these cases. FIGS. 11 and 12 show unprocessed aluminum case 30 (having a diameter of 18 mm), and processed aluminum case 31 and aluminum fluoride layer 31a formed on the inner surface of case 31. Aluminum fluoride layer 31a is formed by applying a plasma treatment in accordance with the requirements described with Table 2 in the second embodiment. Aluminum fluoride layer 31a can be formed also on the outer surface of case 31 without causing any troubles later on.

In order to confirm the advantages of aluminum fluoride layer 31a formed on case 31 thus structured, the EDLCs shown in FIGS. 12A to 12C are manufactured.

The EDLC shown in FIG. 12A is manufactured by vacuum-impregnating conventional element 32 with an electrolytic solution consisting, for example, of TEABF4 in PC solution; inserting it into unprocessed case 30 shown in FIG. 11A; and sealing it with sealing rubber 33. This EDLC is referred to as the conventional product.

The EDLC shown in FIG. 12B is manufactured by vacuum-impregnating conventional element 32 with an electrolytic solution consisting, for example, of TEABF4 in PC solution; inserting it into processed case 31 having aluminum fluoride layer 31a shown in FIG. 11B; and sealing it with sealing rubber 33. This EDLC is referred to as Structure 1.

The EDLC shown in FIG. 12C is manufactured using element 34 whose surface is coated with aluminum fluoride by the plasma treatment described in the third embodiment. Element 34 is vacuum-impregnated with an electrolytic solution consisting, for example, of TEABF4 in PC solution; inserted into processed case 31 having aluminum fluoride layer 31a shown in FIG. 11B; and sealed with sealing rubber 33. This EDLC is referred to as Structure 2.

The comparison results of the properties of these EDLCs are shown in Table 4 below.

As apparent from Table 4, the EDLCs of the present embodiment are excellent in both capacity and resistance in the initial stages, and show little deterioration in capacity and little increase in resistance after the test.

TABLE 4

| | | Structure 1 (FIG. 12B) | Structure 2 (FIG. 12C) | Conventional product (FIG. 12A) |
|---|---|---|---|---|
| Initial | capacity | 76 F | 79 F | 75 F |
| | DCR | 18 mΩ | 14 mΩ | 20 mΩ |
| in 1000 H at | capacity | 65 F | 74 F | 59 F |
| 60° C. and 2.5 V | DCR | 40 mΩ | 29 mΩ | 49 mΩ |

The present embodiment uses an electrolytic solution consisting of TEABF4 in PC solution; however, this is not the only electrolytic solution to be used in the present invention. The same advantages can be obtained by using an electrolytic solution containing an amidine-based electrolyte such as 1-ethyl-3-methylimidazole, 1-ethyl-2,3-dimethylimidazole, or other organic electrolytes.

The PC can be replaced by an organic solvent such as γ-butyrolactone, or by a mixture solvent containing PC and an organic solvent such as dimethyl carbonate to obtain the same advantage.

Although the described element is cylindrical, it can be flat, laminated or the like.

Fifth Exemplary Embodiment

The EDLC of the present embodiment is identical to the EDLC of the fourth embodiment except for the element structure. Therefore, the same components as those in the fourth embodiment will be referred to the same numerals and symbols as those in the fourth embodiment and not described in detail again. The following description will be focused on the different portions with reference to drawings.

Figure 13A:
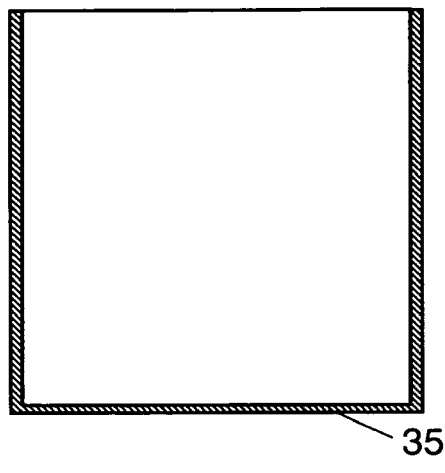
FIG. 13A is a sectional view showing a case in an unprocessed state, which is used in an EDLC of a fifth embodiment of the present invention.
Figure 13B:
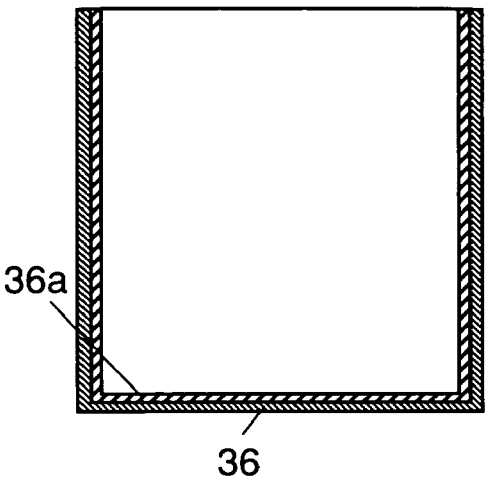
FIG. 13B is a sectional view showing a case in a processed state, which is used in the EDLC of the fifth embodiment of the present invention.

FIGS. 13A and 13B are sectional views showing a case in an unprocessed state and a case in a processed state, respectively, which are used in an EDLC of the fifth embodiment of the present invention.

Figure 14A:
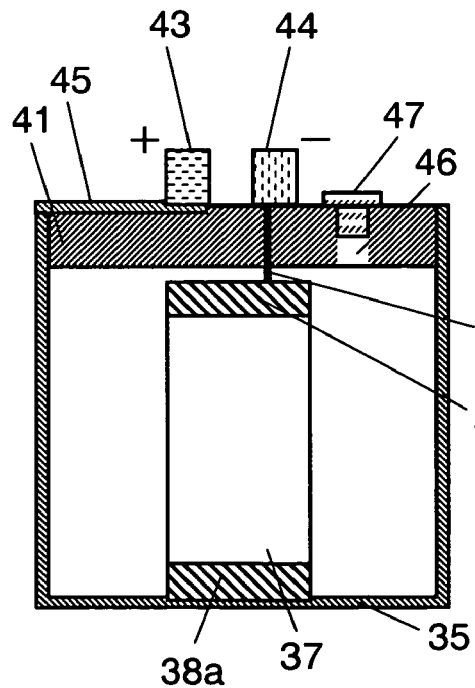
FIGS. 14A and 14B are sectional views showing EDLCs having the cases of the fifth embodiment of the present invention.
Figure 14B:
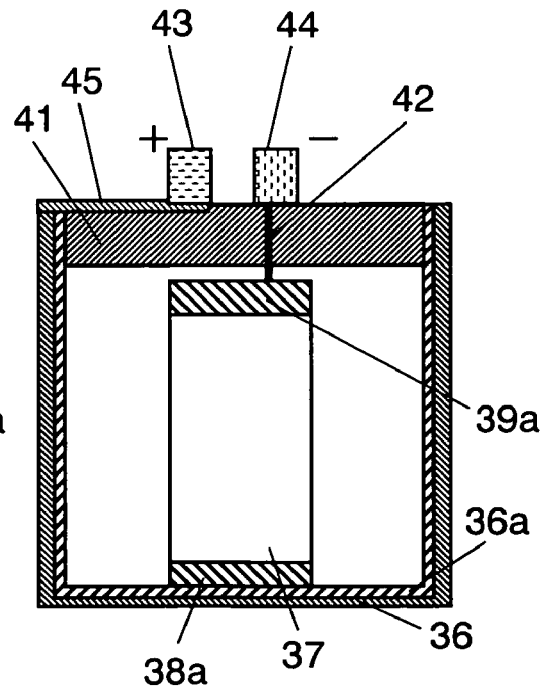

FIGS. 14A and 14B are sectional views showing structures of EDLCs using these cases. FIGS. 13 and 14 show unprocessed aluminum case 35 (having a diameter of 35 mm), and processed aluminum case 36 and aluminum fluoride layer 36a formed on the inner surface of aluminum case 36. Aluminum fluoride layer 36a is formed by applying a plasma treatment in the same manner as in the fourth embodiment. Element 37 is provided with anode collector 38a and cathode collector 39a. Element 37 will be described in detail as follows with reference to FIGS. 15A and 15B.

Figure 15A:
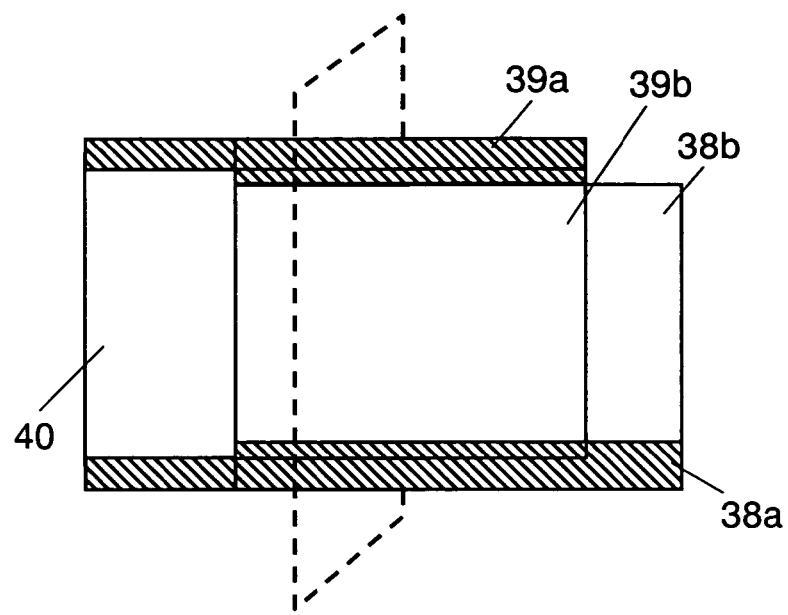
FIG. 15A is a partially developed view showing a structure of an element in the EDLC of the fifth embodiment of the present invention.
Figure 15B:
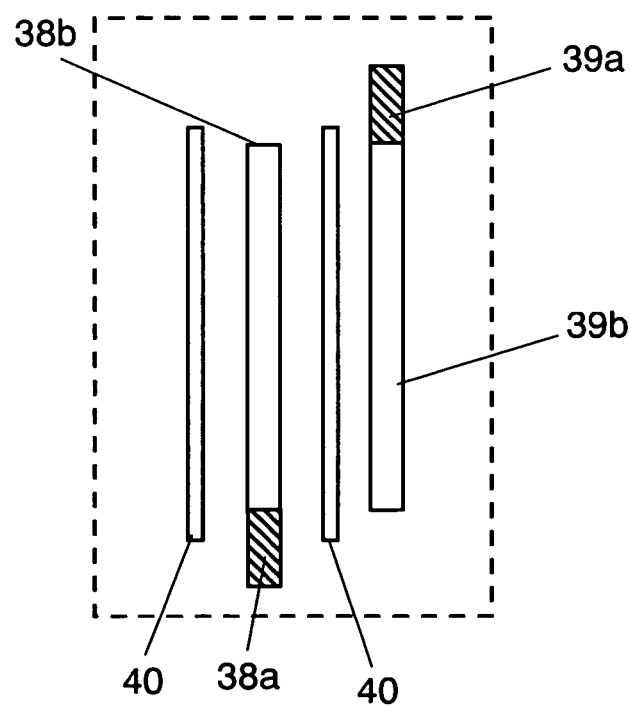
FIG. 15B is a sectional schematic view showing the structure of the element in the EDLC of the fifth embodiment of the present invention.

FIGS. 15A and 15B are a partially developed view and a sectional view (the part in the broken line in FIG. 15A) showing the structure of element 37.

FIGS. 15A and B include anode collector 38a, anode electrode 38b, cathode collector 39a, cathode electrode 39b and separators 40.

Anode electrode 38b and cathode electrode 39b are opposed to each other via separators 40 and are wound together to form element 37.

Anode collector 38a and cathode collector 39a are exposed respectively at the bottom and top ends of element 37. Anode collector 38a is laser-welded to cases 35 and 36. Cathode collector 39a of element 37 is laser-welded to lead plate 42 which will be described later.

Sealing member 41 seals the openings of cases 35 and 36. Sealing member 41 is provided with lead plate 42 to which cathode collector 39a of element 37 is bonded, and also with anode terminal 43 and cathode terminal 44 for external connection. Anode terminal 43 is bonded to cases 35 and 36 via connection bar 45. Cathode terminal 44 is bonded to lead plate 42.

Pressure control valve 47 is inserted in such a manner that inlet 46 for injecting the electrolytic solution is sealed after the injection. Although it is not illustrated, an electrolytic solution consisting, for example, of TEABF4 in PC solution is used as the electrolytic solution.

EDLCs are manufactured using unprocessed case 35 shown in FIG. 14A, and case 36 provided with aluminum fluoride layer 36a shown in FIG. 14B. The former EDLC is referred to as the conventional product and the latter as Structure 3. The comparison results of the properties of these EDLCs are shown in Table 5.

TABLE 5

|  |  | Conventional product (FIG. 14A) | Structure 3 (FIG. 14B) | Structure 4 (FIG. 17A) | Structure 5 (FIG. 17B) |
|---|---|---|---|---|---|
| Initial | capacity | 1260 F | 1273 F | 1276 F | 1288 F |
|  | DCR | 2.0 mΩ | 1.8 mΩ | 1.8 mΩ | 1.7 mΩ |
| in 1000 H at 60° C. and 2.5 V | capacity | 1096 F | 1102 F | 1112 F | 1155 F |
|  | DCR | 3.1 mΩ | 2.8 mΩ | 2.9 mΩ | 2.4 mΩ |

As apparent from Table 5, the EDLC of the present embodiment is excellent in both capacity and resistance in the initial stages, and shows little deterioration in capacity and little increase in resistance after the test.

The present embodiment uses an electrolytic solution consisting of TEABF4 in PC solution; however, this is not the only electrolytic solution to be used in the present invention. The same advantages can be obtained by using an electrolytic solution containing an amidine-based electrolyte such as 1-ethyl-3-methylimidazole, 1-ethyl-2,3-dimethylimidazole, or other organic electrolytes.

The PC can be replaced by an organic solvent such as γ-butyrolactone, or by a mixture solvent containing PC and an organic solvent such as dimethyl carbonate to obtain the same advantage.

Although the described element is cylindrical, it can be flat, laminated or the like.

Sixth Exemplary Embodiment

The EDLC of the present embodiment differs from the EDLC of the fifth embodiment only in how to form the aluminum fluoride layer in the case. Since the other structure is identical, the same components as those in the fifth embodiment will be referred to using the same numerals and symbols as those in the fifth embodiment and not described in detail again. The following description will be focused on the different portions with reference to the drawings.

Figure 16:
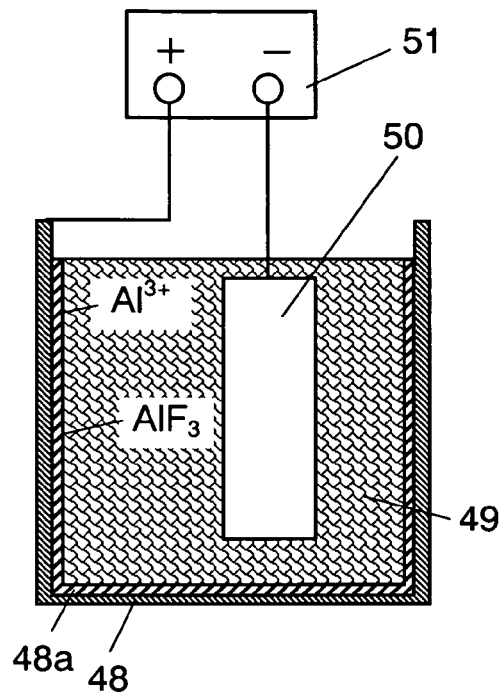
FIG. 16 is a sectional view showing a method for producing a case used in an EDLC of a sixth embodiment of the present invention.

FIG. 16 is a sectional view showing a method for producing a case used in an EDLC of the present invention. As shown in FIG. 16, aluminum case 48 is filled with fluorine-containing solution 49. Fluorine-containing solution 49 used in the present embodiment consists of TEABF4 in PC solution. Fluorine-containing solution 49 has counter electrode 50 inside, which is preferably made of an electrochemically stable metal such as platinum. DC power source 51 is provided to apply a current between case 48 and counter electrode 50, and it is preferable that case 48 and counter electrode 50 have a potential difference of 3 to 5V.

Figure 17A:
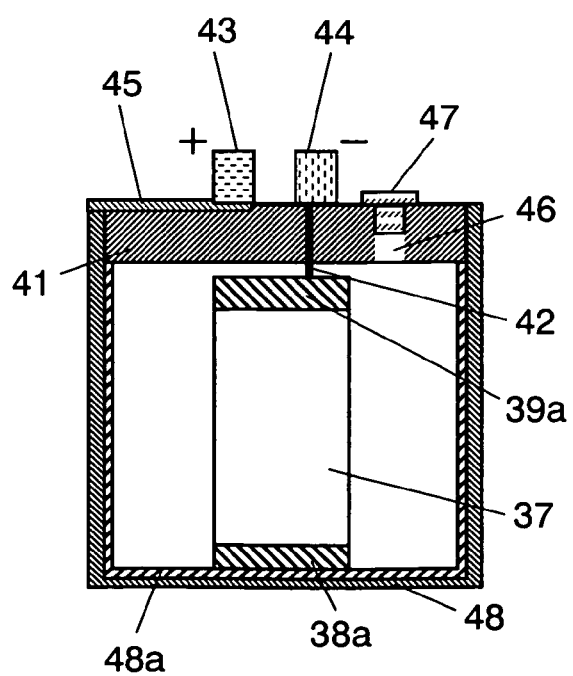
FIG. 17A is a sectional view showing an EDLC having the element of the fifth embodiment of the present invention.
Figure 17B:
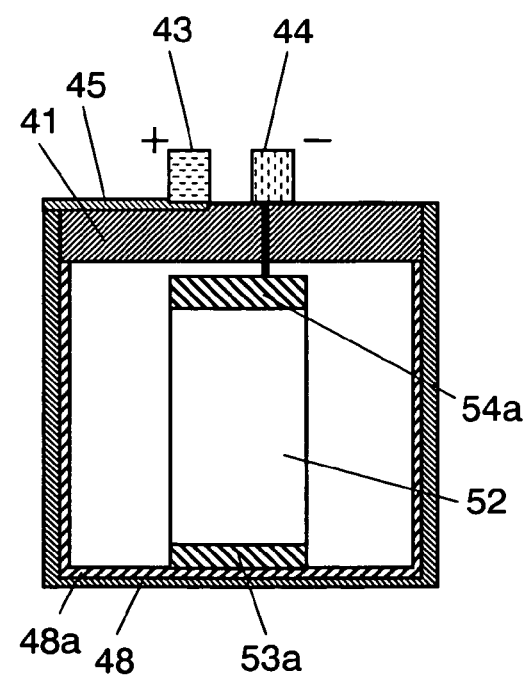
FIG. 17B is a sectional view showing an EDLC having the element of the third embodiment of the present invention.

Applying a current from DC power source 51 in this manner allows the elution of aluminum ions from case 48. The aluminum ions then react with the fluorine ions contained in fluorine-containing solution 49 to form aluminum fluoride. As a result, aluminum fluoride layer 48a is formed on the inner surface of case 48. The aforementioned potential difference is determined by selecting the most efficient requirements. FIGS. 17A and 17B are sectional views showing the structures of EDLCs having case 48 thus produced.

FIG. 17A shows an EDLC having element 37 of the fifth embodiment. This EDLC is referred to as Structure 4. FIG. 17B shows an EDLC having element 52 including the electrode body coated with aluminum fluoride by a plasma treatment in the same manner as in the third embodiment. This EDLC is referred to as Structure 5, and provided with anode collector 53a and cathode collector 54a.

The properties of these EDLCs are shown in Table 5 together with the properties of the EDLC of the fifth embodiment for comparison.

As apparent from Table 5, the EDLCs of the present embodiment are excellent in both capacity and resistance in the initial stages, and show little deterioration in capacity and little increase in resistance after the test.

The present embodiment uses an electrolytic solution consisting of TEABF4 in PC solution; however, this is not the only electrolytic solution to be used in the present invention. The same advantages can be obtained by using an electrolytic solution containing an amidine-based electrolyte such as 1-ethyl-3-methylimidazole, 1-ethyl-2,3-dimethylimidazole, or other organic electrolytes.

The PC can be replaced by an organic solvent such as γ-butyrolactone, or by a mixture solvent containing PC and an organic solvent such as dimethyl carbonate to obtain the same advantage.

Although the described element is cylindrical, it can be flat, laminated or the like.

Seventh Exemplary Embodiment

Figure 18:
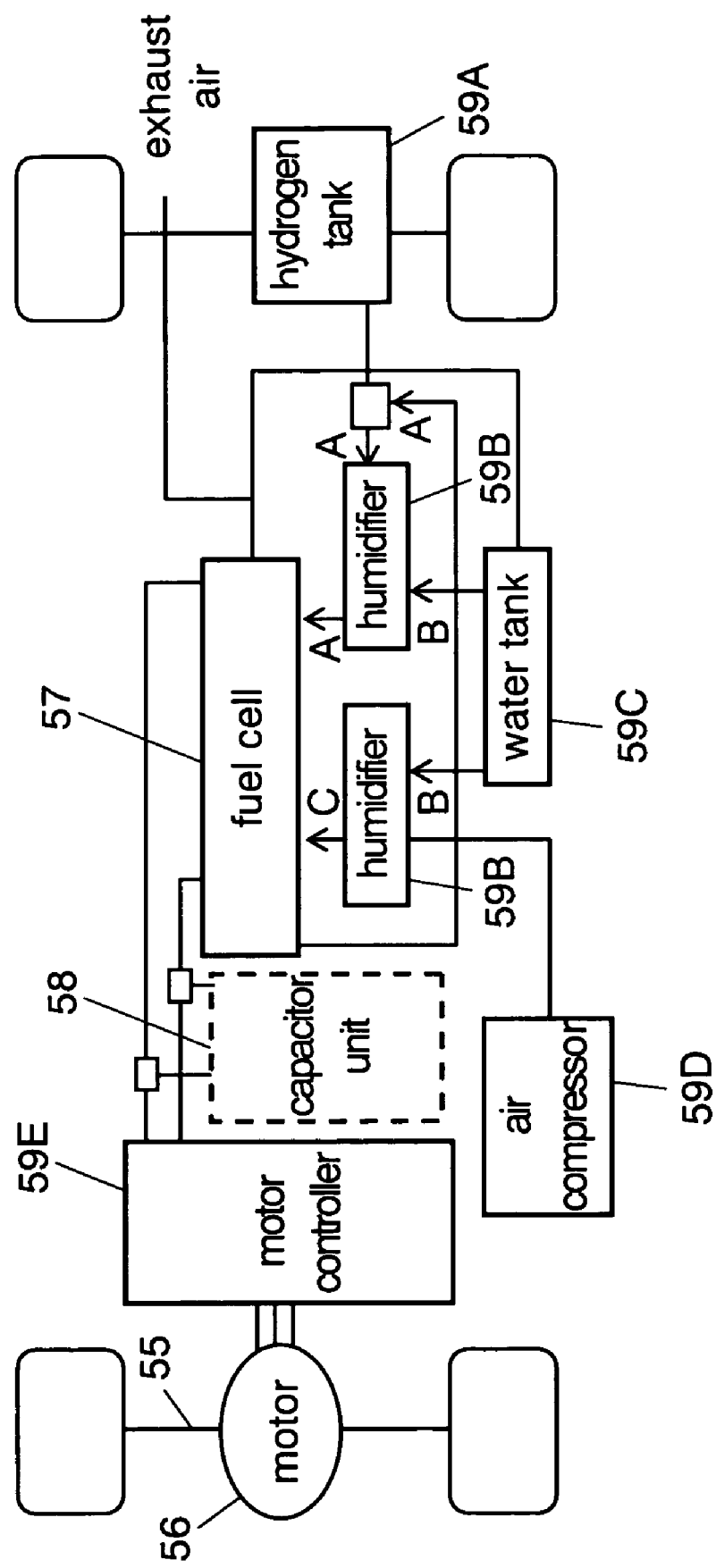
FIG. 18 is a system chart of an EV of a seventh embodiment of the present invention.
Figure 19:
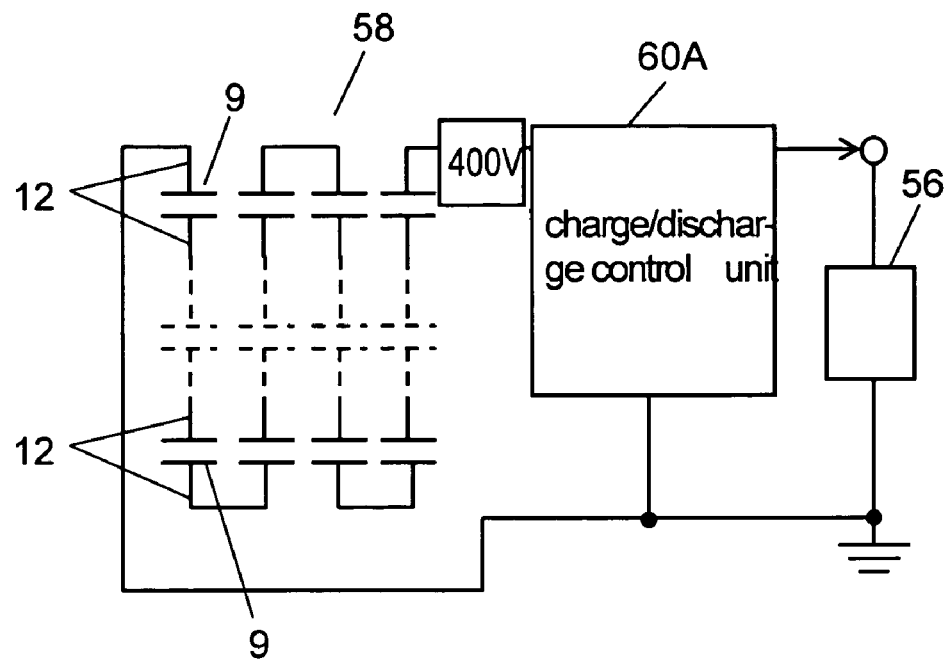
FIG. 19 is a circuit diagram showing a capacitor unit of the EV of the seventh embodiment of the present invention.
Figure 19:
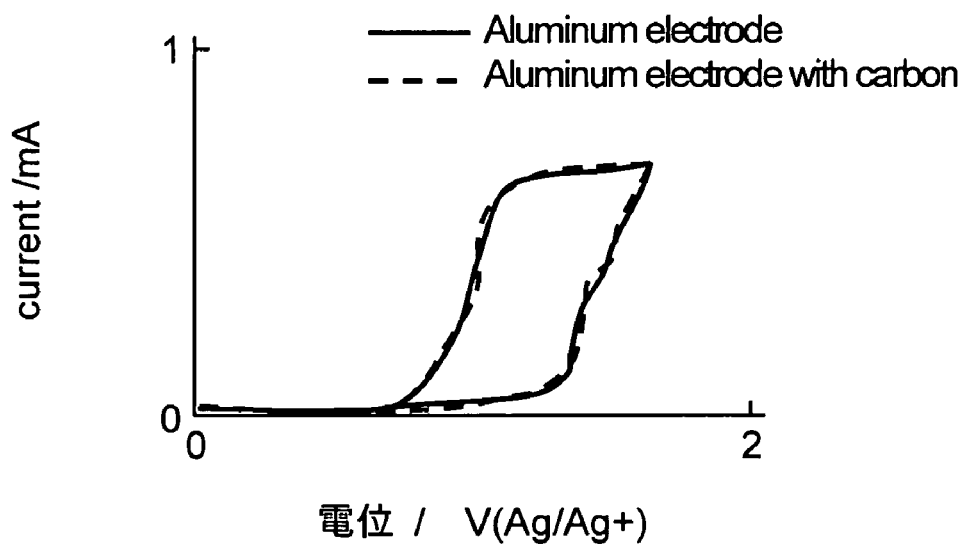

The present embodiment shows an example where the EDLCs shown in the first to sixth embodiments are mounted on an electronic device. As the electronic device, an EV is used. FIG. 18 is a system chart of the EV of the present embodiment. FIG. 19 is a circuit diagram showing a capacitor unit of the EV.

The EV is composed of motor 56 linked with axle 55, fuel cell 57 for supplying current to motor 56, and capacitor unit 58 connected to the current supply path. Capacitor unit 58 includes a plurality of EDLCs of the present embodiment connected in series.

FIG. 18 includes hydrogen tank 59A, humidifier 59B, water tank 59C, air compressor 59D and motor controller 59E. In FIG. 18, arrows "A", "B" and "C" indicate the flows of hydrogen, water and air, respectively.

The capacitor unit shown in FIG. 19 includes charge/discharge control circuit 60A.

In FIG. 19, capacitor unit 58 is required to have a voltage of 400V. This corresponds to 200 conventional EDLCs.

On the other hand, when the EDLC of the second embodiment of the present invention is used, the withstand voltage is 2.6V as mentioned above, so that only 151 EDLCs are required. This results in a reduction in the size of capacitor unit 58, and thus in the size of the electronic device.

The EDLCs can be connected to the current supplying path of motor 56 either in parallel or in series as needed.

As described above, the EDLC of the present invention can have a reduced internal resistance. The EDLC can also have an efficiently improved withstand voltage by making the reaction potential of the anode noble.

Applying aluminum fluoride to the front and rear surfaces of the aluminum electrode foil or to at least an inner surface of the case can provide the following advantage. Aluminum fluoride, which has a strong bonding between the fluorine atoms and the aluminum atoms, reduces the elution of aluminum into the electrolytic solution during voltage application. This prevents the deterioration of the electrode foil.

Although the present embodiment uses an EV as the electronic device, it goes without saying that EVs are not the only example to be used as the electronic device in the present invention.

INDUSTRIAL APPLICABILITY

The EDLC and its manufacturing method according to the present invention can have a reduced internal resistance and an improved withstand voltage, and can also prevent deterioration of the electrode foil. These advantages enable the EDLC to be used widely as, for example, a power source in a variety of electronic devices.

The invention claimed is:

1. An electric double-layer capacitor comprising: a case, an element, a separator and an electrolytic solution,
   the element being composed of a pair of polarizable electrodes, which are one of being wound and laminated with a separator disposed therebetween, and the element being sealed in the case with the electrolytic solution, wherein
   the polarizable electrodes are electrode foils at least one of which is made of aluminum; and
   the at least one of the electrode foils is coated on front and rear sides thereof with aluminum fluoride by applying carbon material to the front and rear sides of the at least one of the electrode foils, and then substituting hydrophobic groups for at least a part of hydrophilic groups of the carbon material.

2. The electric double-layer capacitor of claim 1, wherein active carbon is used as the carbon material.

3. The electric double-layer capacitor of claim 1, wherein fluorine is used as the hydrophobic groups.

4. The electric double-layer capacitor of claim 1, wherein the case is coated on at least an inner surface thereof with aluminum fluoride.

5. A method for manufacturing the electric double-layer capacitor of claim 4, the method comprising:
   applying a plasma treatment to the at least inner surface of the case so as to coat the case with the aluminum fluoride.

6. A method for manufacturing the electric double-layer capacitor of claim 4, the method comprising:
   forming the case using aluminum, filling the case with a fluorine-containing solution, providing an electrode in the case, and applying a direct current between the case and the electrode so as to form a layer of the aluminum fluoride on the inner surface of the case.

7. A method for manufacturing the electric double-layer capacitor of claim 1, the method comprising:
   applying a plasma treatment to the front and rear sides of the electrode foils made of aluminum so as to coat the electrode foils with the aluminum fluoride.

8. An electronic device comprising:
   a motor having a current supply path; and
   the electric double-layer capacitor of claim 1 disposed on the current supply path.

9. The electronic device of claim 8 comprising:
   a plurality of electric double-layer capacitors connected to each other one of in parallel and in series.

10. An electronic device comprising:
    a motor;
    a fuel cell; and
    the electric double-layer capacitor of claim 1 disposed on a current supply path connecting the motor and the fuel cell.

11. The electronic device of claim 10 comprising:
    a plurality of electric double-layer capacitors connected to each other in series.

12. An electric double-layer capacitor comprising: a case, an element, a separator and an electrolytic solution,
    the element being composed of a pair of polarizable electrodes, which are one of being wound and laminated with a separator disposed therebetween, and the element being sealed in the case with the electrolytic solution, wherein
    the polarizable electrodes are electrode foils made of an alloy of carbon and aluminum; and
    the electrode foils are coated on front and rear sides thereof with aluminum fluoride by applying carbon material to the front and rear sides of the electrode foils, and then substituting hydrophobic groups for at least a part of hydrophilic groups of the carbon material.

13. The electric double-layer capacitor of claim 12, wherein active carbon is used as the carbon material.

14. The electric double-layer capacitor of claim 12, wherein fluorine is used as the hydrophobic groups.

15. The electric double-layer capacitor of claim 12, wherein the case is coated on at least an inner surface thereof with aluminum fluoride.

16. A method for manufacturing the electric double-layer capacitor of claim 15, the method comprising:
    applying a plasma treatment to the at least inner surface of the case so as to coat the case with the aluminum fluoride.

17. A method for manufacturing the electric double-layer capacitor of claim 15, the method comprising:
    forming the case using aluminum, filling the case with a fluorine-containing solution, providing an electrode in the case, and applying a direct current between the case and the electrode so as to form a layer of the aluminum fluoride on the inner surface of the case.

18. A method for manufacturing the electric double-layer capacitor of claim 12, the method comprising:
    applying a plasma treatment to the front and rear sides of the electrode foils made of aluminum so as to coat the electrode foils with the aluminum fluoride.

19. An electronic device comprising:
    a motor having a current supply path; and
    the electric double-layer capacitor of claim 12 disposed on the current supply path.

20. The electronic device of claim 19 comprising:
    a plurality of electric double-layer capacitors connected to each other one of in parallel and in series.

21. An electronic device comprising:
    a motor;
    a fuel cell; and
    the electric double-layer capacitor of claim 12 disposed on a current supply path connecting the motor and the fuel cell.

22. The electronic device of claim 21 comprising:
    a plurality of electric double-layer capacitors connected to each other in series.

23. A method for manufacturing an electric double-layer capacitor comprising a case, an element, a separator and an electrolytic solution,
    the element being composed of a pair of polarizable electrodes, which are one of being wound and laminated with a separator disposed therebetween, and the element being sealed in the case with the electrolytic solution, the method comprising:
    applying carbon to an aluminum foil which is an electrode material; and
    heating the aluminum foil with carbon applied thereto to a temperature at which the aluminum foil and the carbon are alloyed, thereby forming an alloy of carbon and aluminum onto a surface of the electrode material.

24. The method for manufacturing the electric double-layer capacitor of claim 23, wherein
the alloy contains carbon and aluminum in a ratio of 3:4.

25. A method for manufacturing an electric double-layer capacitor comprising a case, an element, a separator and an electrolytic solution,
the element being composed of a pair of polarizable electrodes, which are one of being wound and laminated with a separator disposed therebetween, and the element being sealed in the case with the electrolytic solution, the method
comprising:
applying carbon to an aluminum foil which is an electrode material by one of vacuum deposition, sputtering and CVD; and
heating the aluminum foil with carbon applied thereto to a temperature at which the aluminum foil and the carbon are alloyed, thereby forming an alloy of carbon and aluminum onto a surface of the electrode material.

26. A method for manufacturing an electric double-layer capacitor comprising a case, an element, a separator and an electrolytic solution,
the element being composed of a pair of polarizable electrodes, which are one of being wound and laminated with a separator disposed therebetween, and the element being sealed in the case with the electrolytic solution, the method
comprising:
applying aluminum to a carbon foil which is an electrode material by one of vacuum deposition, sputtering and CVD; and
heating the carbon foil with aluminum applied thereto to a temperature at which the carbon foil and the aluminum are alloyed, thereby forming an alloy of carbon and aluminum onto a surface of the electrode material.

* * * * *